(12) United States Patent
Doubler et al.

(10) Patent No.: US 7,981,143 B2
(45) Date of Patent: Jul. 19, 2011

(54) LINEAR FASTENER SYSTEM AND METHOD FOR USE

(75) Inventors: Robert L. Doubler, Ida, MI (US); John E. Hammill, Sr., Rossford, OH (US)

(73) Assignee: Spinal LLC, Palm Beach Gardens, FL (US)

( * ) Notice: Subject to any disclaimer, the term of this patent is extended or adjusted under 35 U.S.C. 154(b) by 1099 days.

(21) Appl. No.: 10/661,371

(22) Filed: Sep. 10, 2003

(65) Prior Publication Data
US 2005/0053423 A1 Mar. 10, 2005

(51) Int. Cl.
*A61B 17/84* (2006.01)
(52) U.S. Cl. .................................................. 606/300
(58) Field of Classification Search ............. 606/72, 606/73, 104; 623/22.42; 411/39, 40, 41, 411/42, 75
See application file for complete search history.

(56) References Cited

U.S. PATENT DOCUMENTS

| | | | |
|---|---|---|---|
| 255,428 A | 3/1882 | Graham | |
| 590,294 A | 9/1897 | Archer | |
| 4,378,187 A | 3/1983 | Fullerton | |
| 4,419,026 A | 12/1983 | Leto | |
| 4,653,969 A | 3/1987 | Summerlin et al. | |
| 4,684,284 A | 8/1987 | Bradley, Jr. | |
| 4,822,223 A | 4/1989 | Williams | |
| 4,836,196 A | 6/1989 | Park et al. | |
| 4,854,304 A | 8/1989 | Zielke | |
| 4,887,595 A | 12/1989 | Heinig et al. | |
| 4,887,596 A | 12/1989 | Sherman | |
| 4,946,458 A | 8/1990 | Harms et al. | |
| 5,002,542 A | 3/1991 | Frigg | |
| 5,110,244 A | 5/1992 | Garman | |
| 5,129,900 A | 7/1992 | Asher et al. | |
| 5,133,717 A | 7/1992 | Chopin | |
| 5,258,015 A * | 11/1993 | Li et al. | 606/232 |
| 5,324,150 A | 6/1994 | Fullerton | |
| 5,427,488 A | 6/1995 | Fullerton et al. | |
| 5,487,744 A | 1/1996 | Howland | |
| 5,549,608 A | 8/1996 | Errico et al. | |
| 5,569,247 A | 10/1996 | Morrison | |
| 5,591,166 A | 1/1997 | Bernhardt et al. | |
| 5,613,816 A | 3/1997 | Cabahug | |
| 5,613,968 A | 3/1997 | Lin | |
| 5,628,740 A | 5/1997 | Mullane | |
| 5,653,765 A | 8/1997 | McTghe et al. | |
| 5,716,357 A | 2/1998 | Rogozinski | |
| 5,749,690 A | 5/1998 | Kutz | |
| 5,788,443 A | 8/1998 | Cabahug | |

(Continued)

FOREIGN PATENT DOCUMENTS

DE 197 20 782 A1 11/1998

(Continued)

*Primary Examiner* — Eduardo C Robert
*Assistant Examiner* — David Comstock
(74) *Attorney, Agent, or Firm* — McHale & Slavin, P.A.

(57) ABSTRACT

The present invention provides a linear fastening system capable of rapid engagement and disengagement. More specifically, the system utilizes a cooperating collet member and a compression ring member which are constructed and arranged to slip easily over a shank member. The fastener system is secured by sliding a compression member in a linear overlapping fashion over the collet member thereby utilizing the conical surfaces to compress the collet member to grip the outer surface of the shank member. In this manner, the linear fastener system is capable of providing a secure connection between multiple components without the need to apply rotational torque to the assembly.

26 Claims, 8 Drawing Sheets

U.S. PATENT DOCUMENTS

| | | | |
|---|---|---|---|
| 5,800,108 A | 9/1998 | Cabahug | |
| 5,800,435 A | 9/1998 | Errico et al. | |
| 5,816,761 A | 10/1998 | Cassatt | |
| 6,050,997 A | 4/2000 | Mullane | |
| 6,063,090 A | 5/2000 | Schlapfer | |
| 6,090,111 A | 7/2000 | Nichols | |
| 6,102,952 A | 8/2000 | Koshino | |
| 6,162,234 A | 12/2000 | Freedland et al. | |
| 6,179,512 B1 | 1/2001 | Gibson et al. | |
| RE37,227 E | 6/2001 | Brodbeck | |
| 6,254,602 B1 | 7/2001 | Justis | |
| 6,537,005 B1 | 3/2003 | Denham | |
| 6,602,255 B1 | 8/2003 | Campbell et al. | |
| 6,623,485 B2 | 9/2003 | Doubler et al. | |
| 7,105,029 B2 * | 9/2006 | Doubler et al. | 623/22.42 |
| 2002/0114680 A1 | 8/2002 | Stoewer | |
| 2003/0009219 A1 * | 1/2003 | Seyr et al. | 623/13.14 |
| 2003/0073996 A1 | 4/2003 | Doubler et al. | |
| 2003/0149487 A1 | 8/2003 | Doubler et al. | |
| 2004/0006342 A1 | 1/2004 | Altarac et al. | |

FOREIGN PATENT DOCUMENTS

| | | |
|---|---|---|
| DE | 100 05 386 A1 | 8/2001 |
| WO | WO 00/15125 | 3/2000 |

* cited by examiner

LINEAR FASTENER SYSTEM AND METHOD FOR USE

REFERENCE TO RELATED APPLICATIONS

This application is related to patent application Ser. No. 10/358,427, filed Apr. 4, 2003, the contents of which are herein incorporated by reference in their entirety.

FIELD OF THE INVENTION

The present invention relates to fasteners capable of rapid linear engagement and disengagement. More specifically, the system utilizes a combination of interlocking sleeve members which combine to form a versatile and effective fastener system which may be used to connect components together without placing torque on the assembly.

BACKGROUND OF THE INVENTION

In general, a fastener is any device used to connect or join two or more components to create an assembly. In the field of manufacturing there are numerous assembly processes requiring individual components to be joined with fasteners to create an assembled product. Most of these processes, requiring fixations of one component in relation to another are currently performed using threaded fasteners for connections. The most common threaded fasteners are referred to by many names, among them: bolts, screws, nuts, studs, lag screws, and set screws.

Since the invention of the threaded fastener, and particularly the bolt and nut combination, various attempts aimed at improving the efficiency of assembling components with threaded fasteners have been made. For this reason, today's product designer has an extraordinary array of choices and possible permutations of known fastening concepts and features. Literally hundreds of types and variations of threaded fasteners are available. Because threaded fastener connections often have a significant impact on assembly cost and product reliability, a great deal of design effort is directed to more efficient designs. Fastener design effort typically involves compromises among considerations such as cost, size, reliability, performance, ease of manufacture, and retrofit capability to existing product designs. While some of these designs improve assembly efficiency, they often result in extremely complex, specialized and expensive fastening components.

In addition to the assembly costs associated with threaded fasteners, the rotational torque required for proper utilization of threaded fasteners is often undesired. When a bolt is used to clamp two parts, the force exerted between the parts is the clamping load. The clamping load is created by exerting a tightening torque on the nut or the head of the screw. These forces keep the threads of the mating parts in intimate contact and decrease the probability of the fastener loosening in service. These forces may damage delicate assemblies, such as electronics and the like. Lock washers, plastic inserts in the nut or bolt, adhesives, cotter pins, locking tabs, etc. are often used to reduce the torque required to prevent a nut and bolt combination from becoming loose during operation. While these devices are generally effective, they add cost and complexity to the assembly operation especially where automated equipment is utilized.

Accordingly, what is lacking in the prior art is a cost effective fastening system capable of linear engagement. The fastener system should achieve objectives such as providing improved manufacturing and assembly efficiency, effective reliable performance, corrosion resistance, and torque-less assembly. The system should include packaging flexibility for installation on various products including retrofitting existing product configurations with minimal modification of the original product.

DESCRIPTION OF THE PRIOR ART

A number of prior art threaded fastening systems exist for attaching components together to form an assembly. Most of the systems, for example bolts and nuts, utilize a combination of internally and externally threaded components to achieve the clamping forces necessary to create the desired assemblies.

It is also known in the prior art to provide various fasteners capable of partial linear and partial rotational engagement. These fasteners generally feature radially inwardly or outwardly biased arcuate segments mounted to engage the threads of a bolt, nut or other threaded member. The threaded segments are generally movably mounted within a casing or around a shaft and resiliently urged inwardly or outwardly. Typically the devices are provided with axially spaced apart radially inwardly directed surfaces of revolution, such as frustoconical surfaces, extending at a common acute angle to the axis of the fastener. In this manner the fasteners and couplings may be secured by merely pushing the threaded components together, thereafter final tightening is accomplished by rotation of the fasteners.

U.S. Pat. No. 5,788,443 to Cabahug discloses a male coupling device featuring movably mounted threaded members which are capable of rapid engagement and disengagement with respect to the stationary threads of a female coupling device. The male coupling device includes a handled shaft having a plurality of threaded segments surrounding the shaft, a sleeve is mounted to move relative to the handle to move the threaded segments inwardly and outwardly to effectively vary the diameter of the assembled threaded elements.

U.S. Pat. No. 5,613,816 to Cabahug discloses an apparatus for rapidly engaging and disengaging threaded coupling members. The complex device includes pin assemblies moveably fitted within adjacent V-shaped segments of the movably mounted externally threaded elements. The device is constructed such that as the coupling members are moved relative to one another the pin assemblies force the threaded elements apart. In addition, ball assemblies are required to maintain proper alignment and locking action of the threaded segments, further adding to the complexity of the device.

U.S. Pat. No. 5,800,108 to Cabahug discloses apparatus for rapidly engaging and disengaging threaded coupling members, which eliminates the ball assemblies of his prior disclosure. The device includes an outer body with a plurality of pull/lock/torque pins extending inwardly to cooperate with oval indentations and apertures extending along the side of the threaded segments. When the sleeve associated with the outer body is moved down, the pins abut the oval indentations to lock the threaded elements in place. As the sleeve is pulled upwardly the pull/lock/torque pins clear a ledge formed on the threaded segments allowing them to move. Continued pulling back of the sleeve allows the pins to pass through apertures and causes the threaded segments to engage a ramp to direct the segments back and away from the bolt member. The construction requires extremely tight machining tolerances to prevent the pins from deflecting to the side and preventing operation of the device. In addition, the amount of torque which can be applied to the threaded segments is limited to that which the pins and the oval indentations can withstand, limiting the device to light duty applications.

U.S. Pat. No. 4,378,187 to Fullerton discloses a quick acting nut assembly. The device consists of a multi-part nut casing having an inclined interior surface adapted for sliding engagement with a threaded jam nut which wedges therein. As the jam nut moves in a first direction along the inclined surface, it compresses radially and the threads of the jam nut engage the threads of the bolt. As the jam nut moves in a second direction along the inclined surface, it may expand radially and disengage from the bolt. When the jam nut is in the engaged position it may be tightened by conventional rotational motion. As the device is tightened the threaded segments increase pressure against the fastener making the task of torquing the fastener to a specified torque difficult. In addition, due to the size of the device, it requires additional space for wrench clearance and the like.

U.S. Pat. Nos. 5,324,150 and 5,427,488 to Fullerton disclose threaded fasteners having a casing that enclose at least three inwardly biased arcuate segments positioned to engage the threads of a bolt. The casing defines spaced apart frustoconical surfaces directed toward the fastener and positioned to engage corresponding surfaces of the segments when the fastener is turned in a first direction. The casing is also provided with a second frustoconical surface for urging the threaded arcuate segments away from the bolt when the fastener is turned in a second direction.

While the prior art devices allow partial linear engagement they require rotational torque to produce the clamping forces required to maintain assemblies. These devices also require extensive machining of thin sections and require difficult assembly processes for manufacture. This combination results in high production cost and weak finished components. Still further, it is well known in the art that cold forming manufacturing techniques result in much stronger and more reliable fasteners. The designs of the prior art devices do not lend themselves to traditional fastener manufacturing techniques, e.g. cold forming, thread rollers, pointers, nut tappers, slotters, shavers etc., adding to the high manufacturing cost and reducing the strength of the fasteners. The present invention teaches a linear fastener system that includes an inner collet member and an outer compressing member that is capable of rapid linear actuated engagement and/or disengagement. In addition, the present invention teaches a linear engaging fastener that is capable of applying precise clamping force to the assembled components without rotating the fastening members. Still further the present invention teaches a fastener system that lends itself to multiple manufacturing techniques.

SUMMARY OF THE INVENTION

The present invention provides a linear fastening system capable of rapid linear engagement and disengagement. More specifically, the system utilizes a cooperating collet member and a compression ring member which are constructed and arranged to slip easily over a shank member while in a first release position. The collet member is constructed and arranged with an inner engaging surface and an outer tapered compression surface, the compression ring member being constructed and arranged with an inner tapered compression surface preferably conjugate in shape the outer surface of the collet member. The fastener system is secured by sliding the compression member in a linear overlapping fashion over the collet member, thereby utilizing the conical surfaces to compress the collet member and place a tensile load on the compression ring to grip the outer surface of the shank member. In this manner, the linear fastener system is capable of providing a secure connection between multiple components without the need to apply rotational torque to the assembly. The connection also allows full thread engagement and a locking connection without the need for plastic inserts or adhesives. When compared to traditional threaded fasteners, the dual conical compression surfaces allow very precise tensile loads to be applied to the shank member. Prior art designs require torque wrenches to apply measured clamping loads to fasteners. Linear compression of the collet member eliminates variations as seen in the prior art due to surface finish, lubrication and variations in thread engagement to achieve a precise clamping load.

Accordingly, it is an objective of the present invention to provide a fastener system capable of securing multiple components into a single assembly without the need to apply torque to the assembly.

An additional objective of the present invention is to provide a fastener system capable of linear engagement and disengagement.

It is a further objective of the present invention to provide a fastener system capable of providing linear engagement to externally threaded surfaces and the like.

A still further objective of the present invention is to provide a fastener system capable of providing linear engagement to snap ring grooves and the like.

Another objective of the present invention is to provide a fastener system capable of providing precise linear clamping forces to a shank member.

Yet another objective of the present invention is to provide a fastener system suited for automated manufacturing and assembly.

Still yet another objective of the present invention is to provide a fastener system that allows close spacing and does not require wrench clearances.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
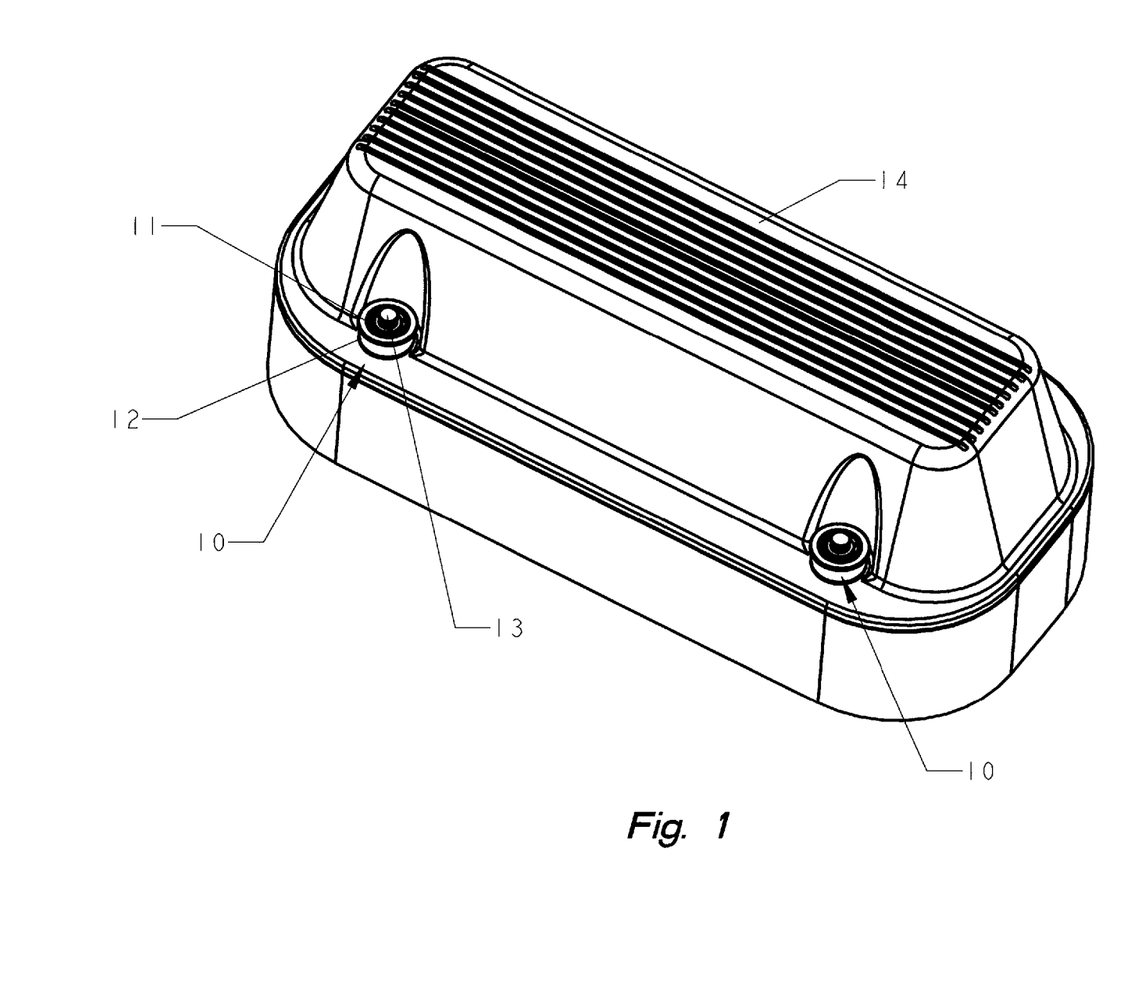
FIG. 1 shows a perspective one embodiment of the instant invention being utilized to secure an automotive valve cover.
Figures 2, 3:
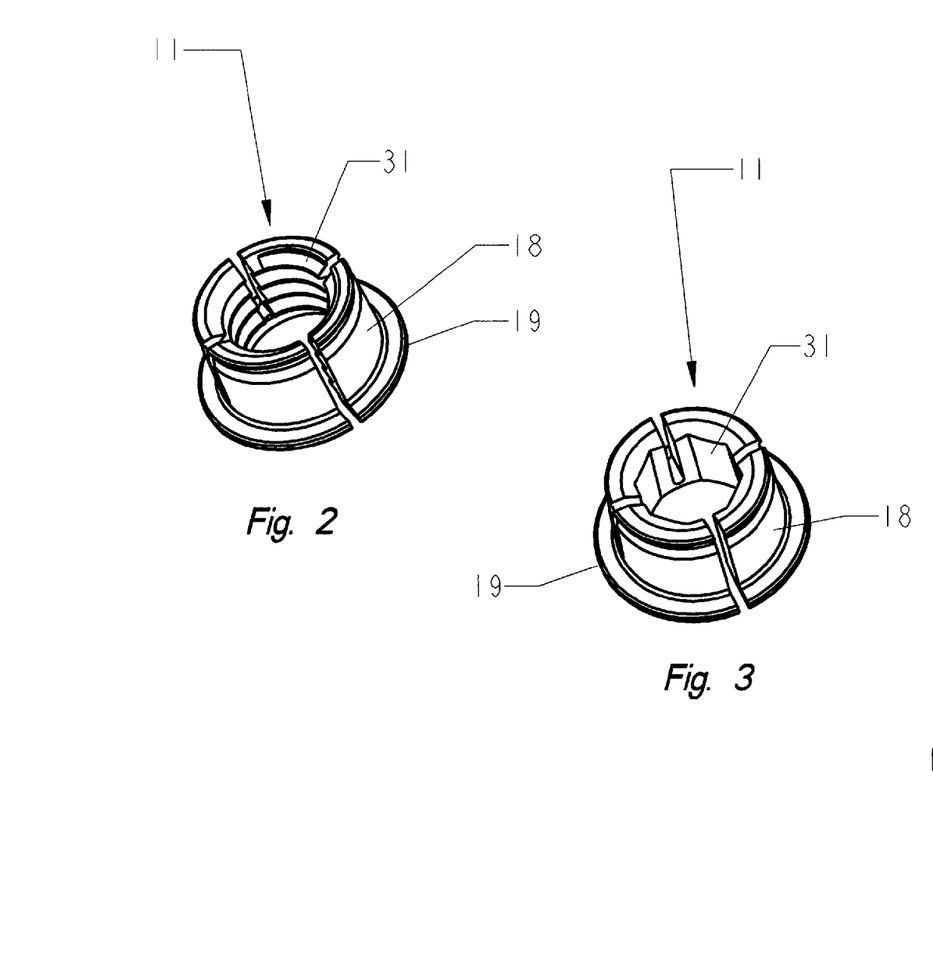
FIG. 2 shows a perspective of one embodiment of the collet member of this invention.
FIG. 3 shows a perspective of one embodiment of the collet member of this invention.
Figure 4:
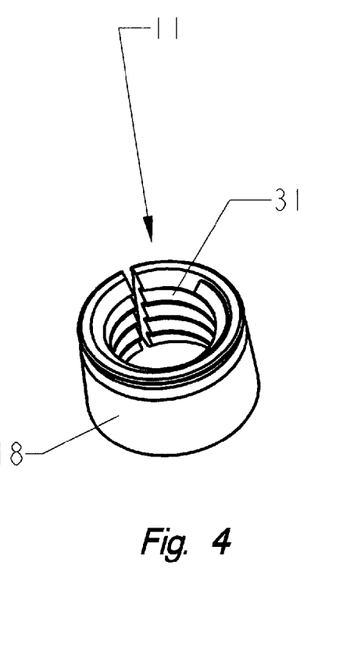
FIG. 4 shows a perspective of one embodiment of the collet member of this invention.
Figures 5, 6:
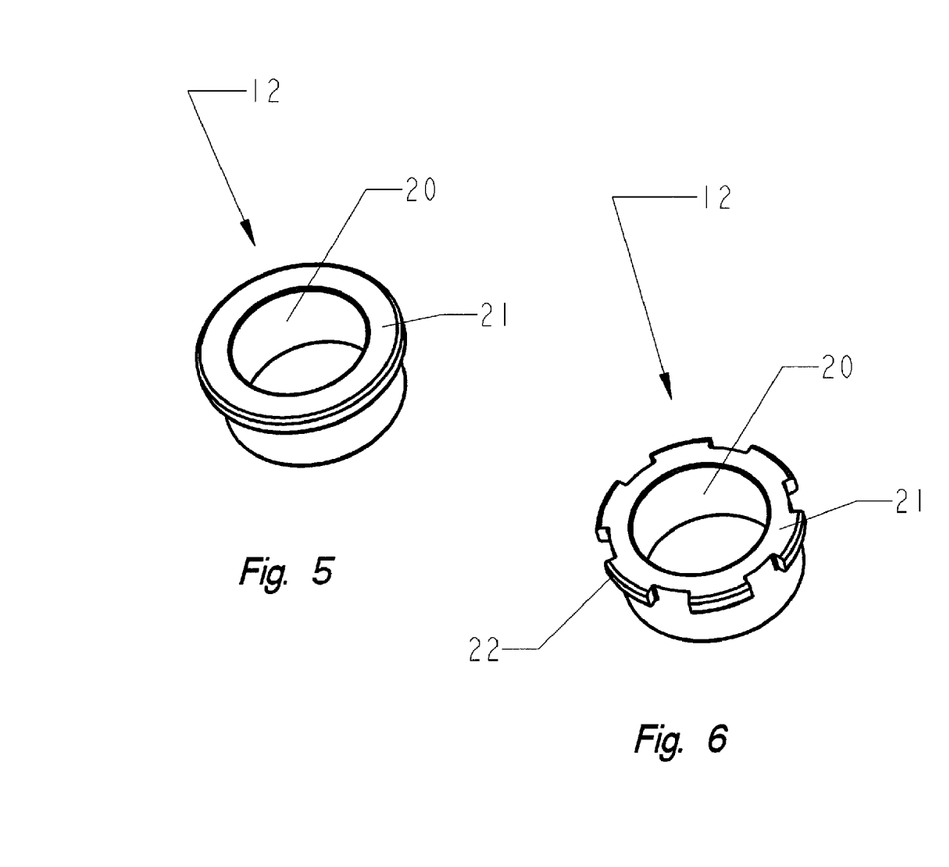
FIG. 5 shows a perspective of one embodiment of the compression ring of this invention.
FIG. 6 shows a perspective of one embodiment of the compression ring of this invention.
Figure 7:
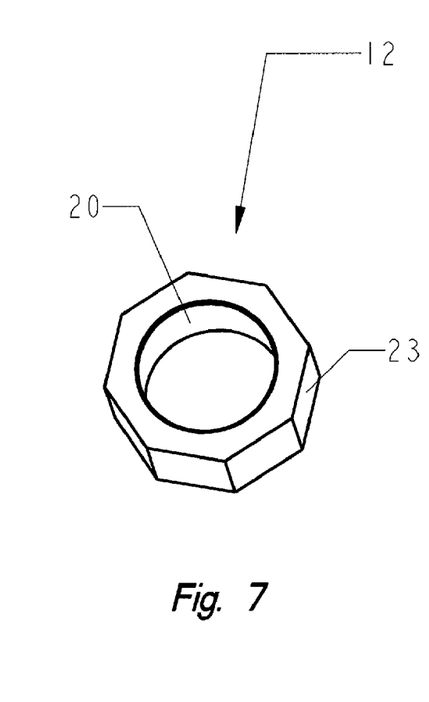
FIG. 7 shows a perspective of one embodiment of the compression ring of this invention.

The linear engaging fasteners 10 utilized to secure the automotive valve cover 14, shown in FIG. 1, are a representation of the general utility of the present invention. The linear fastener generally includes a collet member 11 and a compression ring member 12 which are constructed and arranged to cooperate with a shank member 13. The collet member 11 shown in FIGS. 2 through 4, is slid or loosely threaded over the external gripping surface 15 of a shank member 13 generally shown in FIGS. 8 through 10. The external surface 18 of collet member 11 is tapered or conical in form. The internal gripping surface 31 of collet member 11 is generally constructed and arranged to have a conjugate surface to the gripping surface 15 of the shank member 13 for cooperative engagement therebetween. In addition, the internal gripping surface of the collet member may be constructed and arranged to exert a tensile force on the shank member when compressed. This construction allows precise clamping forces to be applied to an assembly, allows full surface engagement between the shank member and the collet member, and facilitates a locking connection without inserts or adhesive. The collet member 11 may also include a flared base 19 suitable to distribute clamping force over a wide area or provide a bearing surface for relative rotation of adjacent components. The collet member may be constructed of materials well known in the art which may include but should not be limited to steel, bronze, brass, copper, aluminum, plastic, or rubber, as well as suitable combinations thereof. The compression ring 12, shown in FIGS. 5 through 7, has a tapered interior surface 20 which is complementary to the taper of collet member 11. The compression ring 12 may be constructed with a flange 21 about the upper surface. The flange 21 may have optional lugs 22 formed in a C-shape for engaging an extractor (not shown) used to remove or disconnect the coupling. The flange may also have optional wrench flats 23 for engaging wrenches and/or sockets that are well known in the art.

Figure 8:
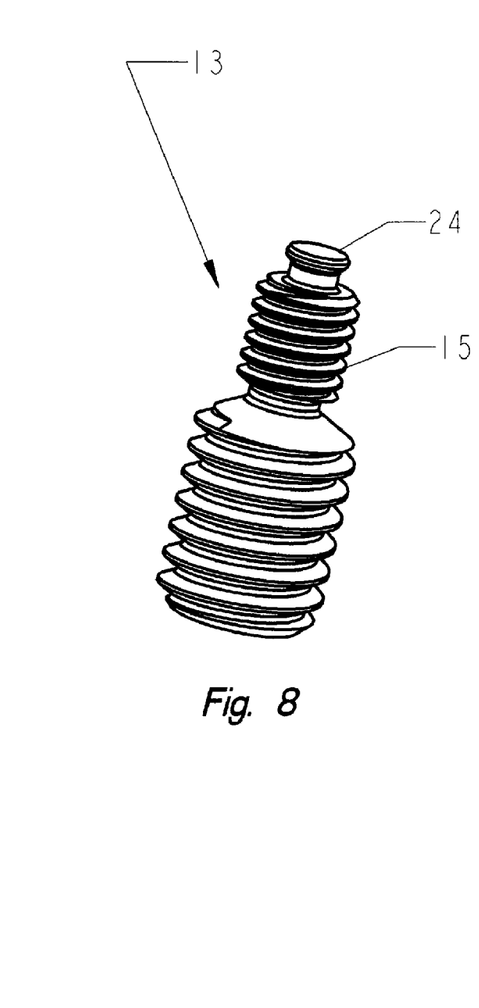
FIG. 8 shows a perspective of one embodiment of the shank member of this invention.
Figure 9:
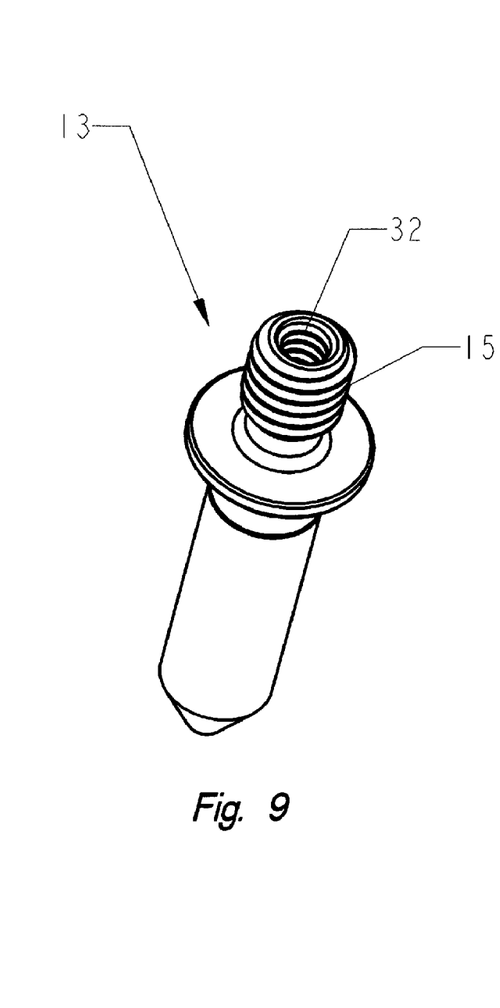
FIG. 9 shows a perspective of one embodiment of the shank member of this invention.
Figure 10:
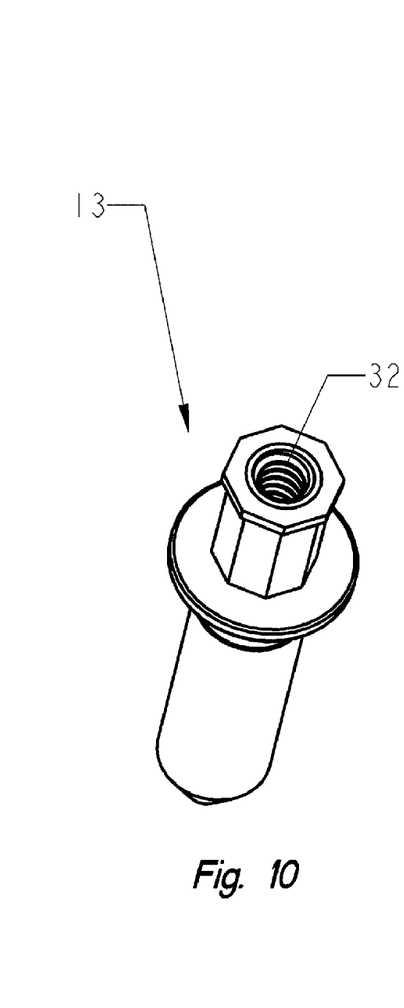
FIG. 10 shows a perspective of one embodiment of the shank member of this invention.

The shank member 13 is generally illustrated in FIGS. 8 through 10. The shank member includes an outer gripping surface 15 which is preferably round in shape, but may be oval, hex, d-shaped, square, rectangular or have other shapes well known in the art that are suitable for shank and/or shaft use. The outer gripping surface may also include any number of surface finishes well known in the art to enhance the gripping action between the shank member and the collet member, including but not limited to, threads, knurl, rings, snap ring grooves, generally smooth or tapered surface, or suitable combinations thereof, as well as other surfaces suitable for providing adequate grip to secure an assembly.

Figure 11:
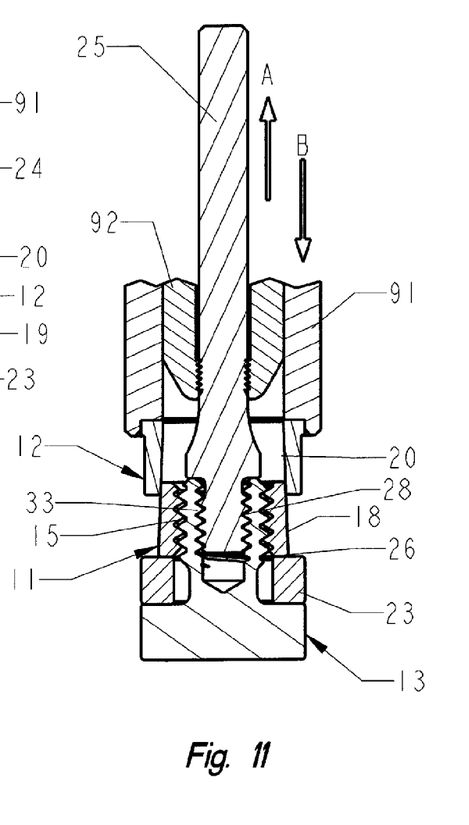
FIG. 11 shows assembly with linear coupling of this invention.
Figure 12:
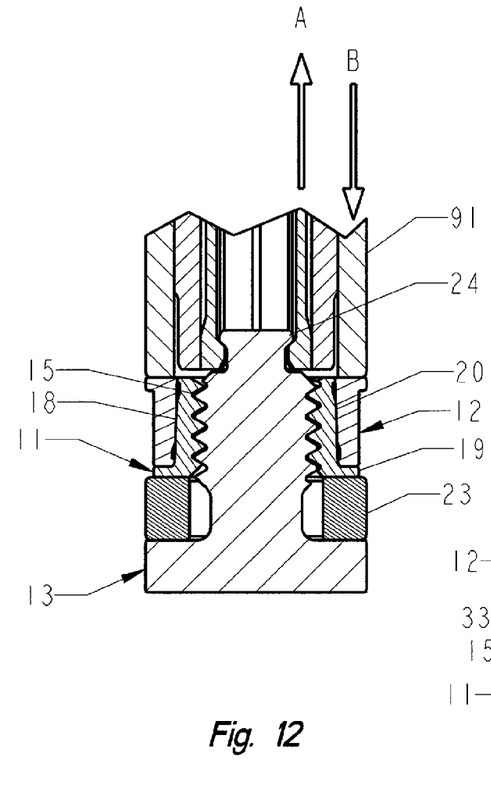
FIG. 12 shows assembly with linear coupling of this invention.

FIGS. 11 and 12 show non-limiting alternative methods of assembly of the linear fastener 10. In FIG. 11, the collet member 11 can be slid or loosely threaded onto the gripping surface 15 of the shank member, illustrated herein having exterior threads, with the external taper extending from a large diameter in contact with the component 23 to a smaller diameter. The relationship between the threads on the shank and the collet are constructed and arranged to cause a clamping force when the collet is compressed. The shank member may also include an optional tensioning means constructed and arranged to allow a predetermined amount of clamping force or tension to be applied to the components and/or the shank member. The optional tensioning means illustrated herein in a non-limiting embodiment as an internal bore 32 which includes internal threads 28. The internal bore is constructed and arranged to cooperate with a tension rod 25. The tension rod includes external threads 26 which are threaded into the internal threads 28 of the shank member. The external threads 26 engage internal threads 28 of the shank member to apply a predetermined amount of clamping force to the component(s) 23 prior to sliding the compression ring 12 over the collet member 11. The tapered wall 20 of compression ring 12 is frictionally engaged with the tapered wall 18 of the collet member 11. The linear compression coupling results from equal and opposite forces, A and B, shown in FIGS. 11 and 12, being applied to the compression ring and the collet member, simultaneously.

Figure 17:
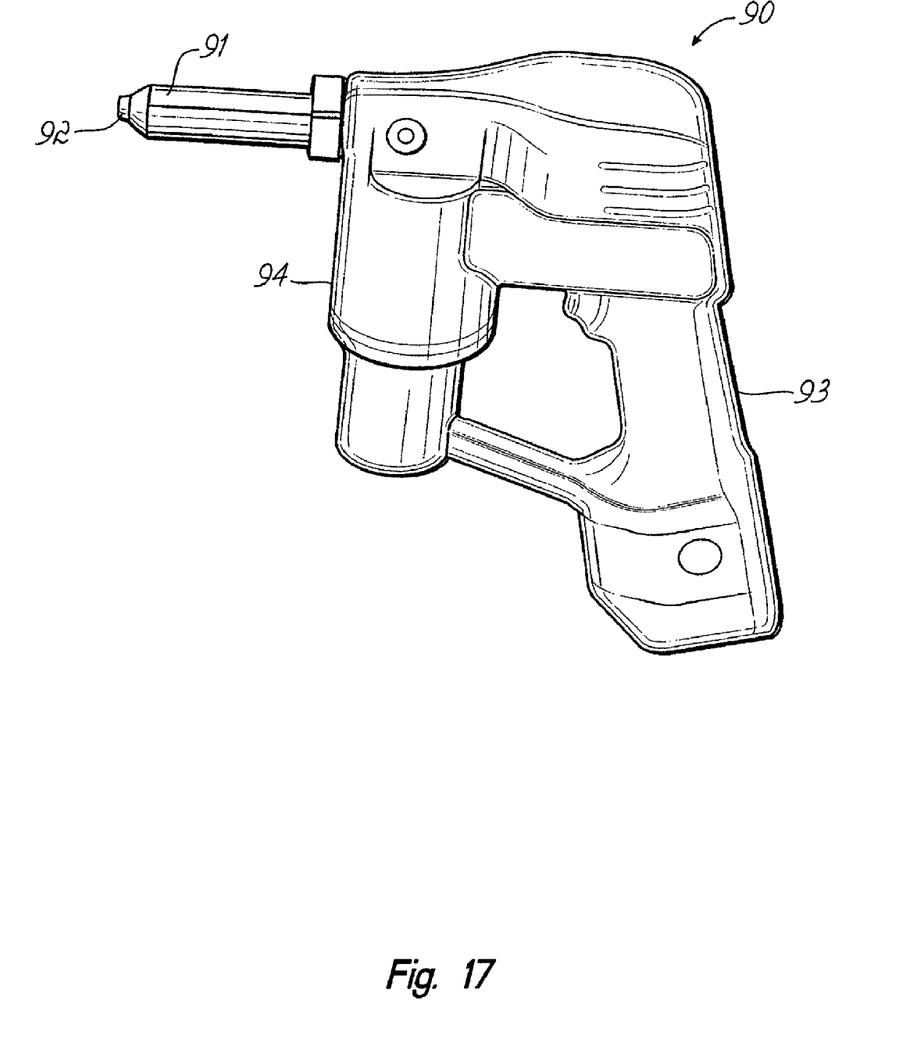
FIG. 17 shows an implement for applying linear compression.

FIG. 12 shows an alternative tension means for applying a predetermined amount of clamping force to a component, wherein the shank member 13 includes a tip 24 constructed and arranged to be grasped by an assembly tool 90 (FIG. 17). Other alternative tension means suitable for grasping the shaft member to apply a predetermined amount of clamping force to the components prior to engaging the linear fastener may include but should not be limited to frangible stems, internal or external grooves, cross drilled apertures, internal bores and flats as well as other suitable means well known in the art.

Figure 13:
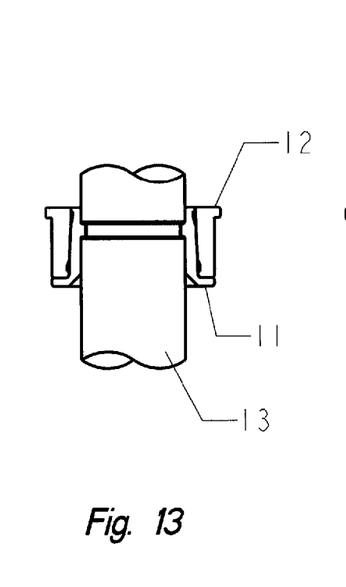
FIG. 13 shows a side view partially in section illustrating one embodiment of the present invention in cooperation with a snap ring groove.
Figure 14:
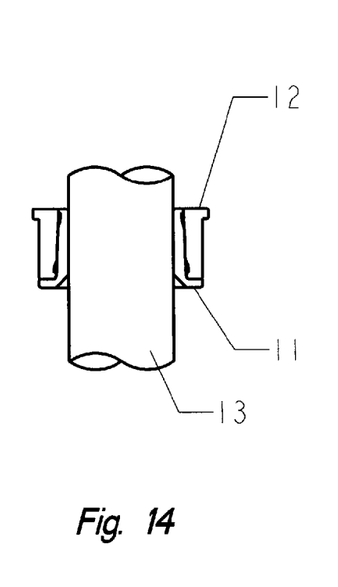
FIG. 14 shows a side view partially in section illustrating one embodiment of the present invention in cooperation with a generally smooth shank surface.
Figure 15:
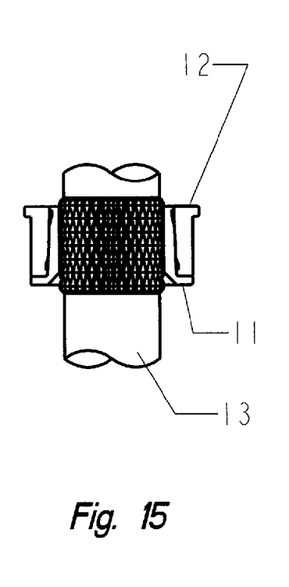
FIG. 15 shows a side view partially in section illustrating one embodiment of the present invention in cooperation with a knurled shank surface.
Figure 16:
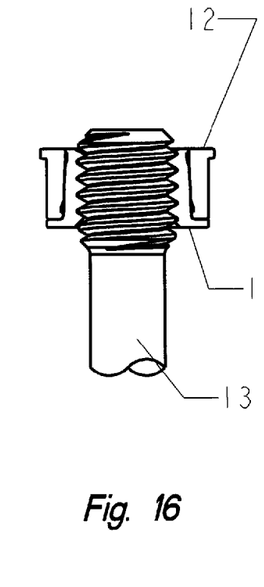
FIG. 16 shows a side view partially in section illustrating one embodiment of the present invention in cooperation with a threaded shank surface.

In FIGS. 13 through 16, final assembly of the collet member 11 and the compression ring 12 are shown engaging various outer gripping surfaces 15 of shank members 13. FIG. 13 depicts an embodiment wherein an inwardly depending lip 40 on the inner gripping surface 31 of the collet member 11 engages a corresponding circumferentially extending groove formed into the external gripping surface 15 of the shank 13, such as a snap ring groove 42.

FIG. 17 shows an instrument having a pistol grip 93, a power source 94 and concentric pistons 91 and 92. Piston 92 is sized to grip the tension rod. Piston 91 is sized to seat on the compression ring. As the instrument 90 (FIG. 17) applies progressive pressure through concentric pistons 91 and 92, the compression ring 12 moves downwardly reducing the diameter of the collet member 11 through the interaction of the complementary tapers. The interior gripping surface of the collet member tightly engages the external gripping surface of the shank.

Once all slack is taken out of the linear coupling, the extension rod may be constructed to break at the limit of optimum pressure. Alternatively, the instrument 90 may have a gauge for setting the desired pressure wherein the shank member is released after compression.

In the event that a linear fastener must be removed, a similar instrument may be employed. One of the pistons would have a flange with flat lugs. The instrument would be placed over the compression ring and turned to engage the flat lugs and opposite force is applied to remove the compression ring from the collet member. The linear coupling is separated without placing pressure on the fastened components.

Figure 18:
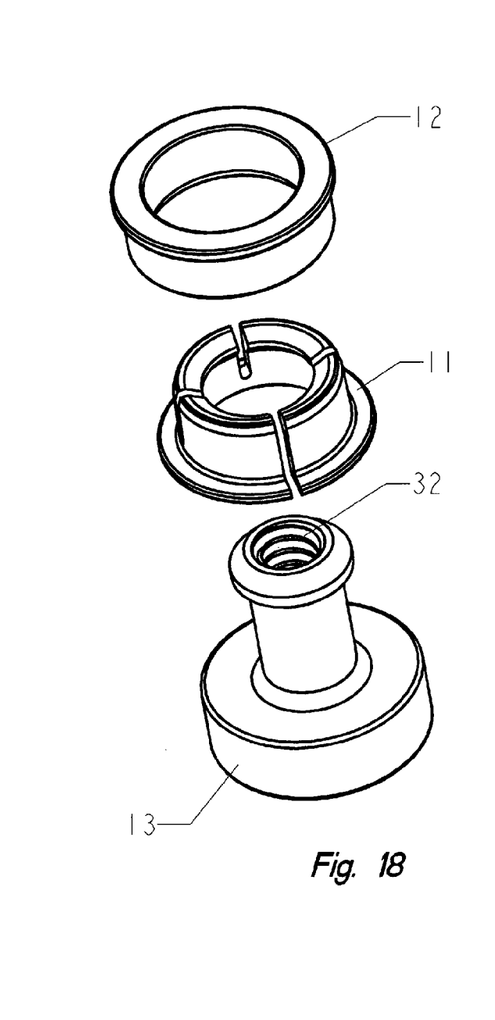
FIG. 18 shows a perspective exploded view of an alternative embodiment of the present invention.
Figure 19:
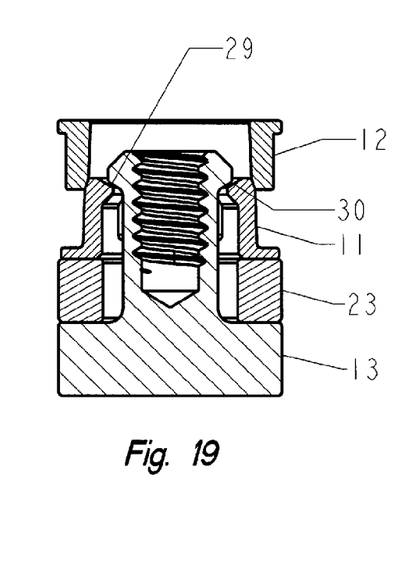
FIG. 19 shows a section view of the embodiment shown in FIG. 18 illustrating the linear fastener in the release position.
Figure 20:
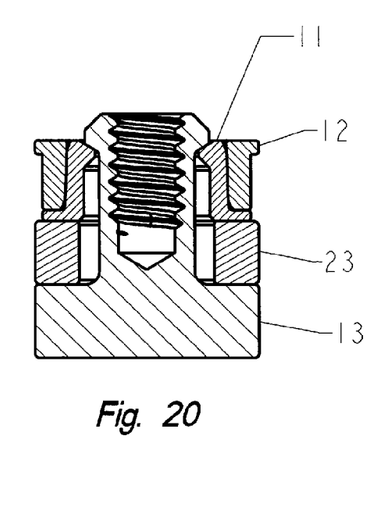
FIG. 20 shows a section view of the embodiment shown in FIG. 18 illustrating the linear fastener in the secured position.

FIGS. 18 through 20 show an alternative embodiment of the present invention wherein progressive linear engagement of the compression ring over the collet member applies tension to the shank member as it ramps upwardly on the collet member. In this embodiment the shank member includes at least one conical or angled surface 29 which cooperates with a conjugate surface 30 within the collet member 11.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A linear fastener system comprising:
   a shank member including an outer gripping surface means formed along a first end and a second end;
   a collet member having a base end, a top end, an inner engaging surface means configured to mesh with said outer gripping surface means of said shank member, and an outer tapered compression surface; and
   a compression ring member having a base end, a front end, an inner tapered compression surface having a substantially conjugate taper conforming to said outer tapered surface of said collet member, and an outer surface;
   said inner tapered compression surface of said compression ring member constructed and arranged for linear overlapping movement in relation to said outer tapered compression surface of said collet member between a first gripping position and a second release position, said gripping position resulting in frictional engagement between a substantial portion of said inner tapered compression surface and said outer tapered compression surface to maintain engagement of said collet and said compression ring members and to compress said collet member thereby gripping said outer gripping surface of said shank member and wherein said release position maintains a sufficient portion of said frictional cooperation to maintain an interfitting relationship between said collet and said compression ring members and results in expansion of said collet member thereby releasing said outer gripping surface of said shank member.

2. The linear fastener system of claim 1 wherein said inner engaging surface is generally smooth.

3. The linear fastener system of claim 1 wherein said inner engaging surface is threaded.

4. The linear fastener system of claim 1 wherein said inner engaging surface is knurled.

5. The linear fastener system of claim 1 wherein said inner engaging surface has a conjugate shape in relation to said outer gripping surface of said shank member.

6. The linear fastener system of claim 1 wherein said inner engaging surface has at least one inwardly depending lip, wherein said inwardly depending lip is constructed and arranged to cooperate with a conjugate surface on said outer gripping surface of said shank member.

7. The linear fastener system of claim 6 wherein said inwardly depending lip is constructed and arranged to cooperate with at least one snap ring groove.

8. The linear fastener system of claim 6 wherein said inwardly depending lip includes at least one conical surface; wherein said outer gripping surface of said shank member has a conjugate conical surface.

9. The linear fastener system of claim 1 wherein said tensioning portion includes at least two generally flat surfaces.

10. The linear fastener system of claim 1 wherein said tensioning portion includes at least one groove extending around the circumference of said first end of said shank member.

11. The linear fastener system of claim 1 wherein said shank member includes a tensioning portion, said tensioning portion includes at least one internal bore extending inwardly from said first end along the longitudinal centerline of said shank member.

12. The linear fastener system of claim 11 wherein said internal bore includes threads.

13. The linear fastener system of claim 11 wherein said internal bore includes at least one groove extending around the circumference of said internal bore.

14. The linear fastener system of claim 1 wherein said outer surface of said compression member includes at least two wrench flats for increasing or decreasing the said tension applied to said shank member.

15. The linear fastener system of claim 1 wherein said collet member is constructed of plastic.

16. The linear fastener system of claim 1 wherein said collet member is constructed of copper.

17. The linear fastener system of claim 1 wherein said collet member is constructed of brass.

18. The linear fastener system of claim 1 wherein said collet member is constructed of bronze.

19. The linear fastener system of claim 1 wherein said collet member is constructed of aluminum.

20. The linear fastener system of claim 1 wherein said collet member is constructed of steel.

21. The linear fastener system of claim 1 wherein said collet member is constructed of rubber.

22. A linear fastener system comprising:
   a shank member including an outer gripping surface means formed along a first end and a second end;

a collet member having a base end, a top end, an inner engaging surface means configured to mesh with said outer gripping surface means of said shank member, and an outer tapered compression surface; and a compression ring member having a base end, a front end, an inner tapered compression surface having a substantially conjugate taper conforming to said outer tapered surface of said collet member, and an outer surface;

said inner tapered compression surface of said compression ring member constructed and arranged for linear overlapping movement in relation to said outer tapered compression surface of said collet member between a first gripping position and a second release position, wherein positioning said inner tapered compression surface over said outer tapered compression surface defines said gripping position to compress said collet member thereby gripping said outer gripping surface of said shank member and wherein positioning first groove over said outer tapered compression surface defines said release position allowing expansion of said collet member thereby releasing said outer gripping surface of said shank member.

23. The linear fastener system of claim 22 wherein said outer tapered compression surface of said collet member and said inner tapered surface of said compression member are constructed and arranged to maintain an interfitting relationship in said release position.

24. The linear fastening system of claim 22 wherein said outer tapered compression surface includes at least one second groove having a reduced diameter with respect to said outer tapered compression surface, said second groove constructed and arranged to align with said groove in said inner surface of said compression ring while in said release position.

25. The linear fastening system of claim 22 wherein said shank member includes a tensioning portion at said first end whereby said shank member is configured to be tensilely loaded when said collet member is in said release position.

26. The linear fastening system of claim 25 wherein said tensioning portion includes a frangible stem, whereby said frangible stem is severed from said first end of said shank member when said shank member reaches a predetermined tension.

* * * * *